United States Patent
Yin

(10) Patent No.: US 9,319,630 B2
(45) Date of Patent: Apr. 19, 2016

(54) METHOD AND DEVICE FOR VIDEO PROCESSING

(71) Applicant: Tencent Technology (Shenzhen) Company Limited, Shenzhen Guangdong (CN)

(72) Inventor: Chengguo Yin, Shenzhen Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/494,677

(22) Filed: Sep. 24, 2014

(65) Prior Publication Data

US 2015/0009284 A1 Jan. 8, 2015

Related U.S. Application Data

(63) Continuation of application No. PCT/CN2013/089239, filed on Dec. 12, 2013.

(30) Foreign Application Priority Data

May 9, 2013 (CN) .......................... 2013 1 0169074

(51) Int. Cl.
- *H04N 7/14* (2006.01)
- *H04L 12/931* (2013.01)
- *H04L 12/861* (2013.01)

(52) U.S. Cl.
CPC .............. *H04N 7/147* (2013.01); *H04L 49/206* (2013.01); *H04L 49/9047* (2013.01)

(58) Field of Classification Search
CPC ........................... H04L 49/9047; H04N 7/147
USPC ...................................................... 348/14.12
See application file for complete search history.

(56) References Cited

U.S. PATENT DOCUMENTS

| | | | | |
|---|---|---|---|---|
| 5,822,493 | A * | 10/1998 | Uehara | G11B 27/002 348/E5.112 |
| 6,647,200 | B1 * | 11/2003 | Tanaka | G08B 13/19604 348/E7.086 |
| 2004/0234000 | A1 * | 11/2004 | Page | H04J 3/00 375/259 |
| 2007/0263070 | A1 | 11/2007 | Harris | |

FOREIGN PATENT DOCUMENTS

| | | |
|---|---|---|
| CN | 101378484 A | 3/2009 |
| CN | 101668223 A | 3/2010 |
| JP | 2011066944 A | 3/2011 |

OTHER PUBLICATIONS

International Search Report and Written Opinion of the International Searching Authority, dated Mar. 13, 2014, pp. 1-8, issued in International Application No. PCT/CN2013/089239, The State Intellectual Property Office, Beijing, The People's Republic of China.

* cited by examiner

*Primary Examiner* — Creighton Smith
(74) *Attorney, Agent, or Firm* — Brinks Gilson & Lione

(57) ABSTRACT

A method and a device are provided for processing a video transmitted over a communication network. The video processing may include timing playback of an image frame of the video so as to maintain a continuous playback of the video regardless of network delays and other adverse factors. An ith image frame of the video may be fetched for processing from a buffer queue. A sampling interval of the ith image frame may be calculated. Further, a waiting time and a regulated waiting time of the ith image frame may be calculated. A playing interval of the ith image frame may be determined based on the regulated waiting time. If the time elapsed since start of playback of an (i−1)th image frame of the video is not shorter than the playing interval of the ith image frame, the ith image frame may be played at the current time point.

17 Claims, 5 Drawing Sheets

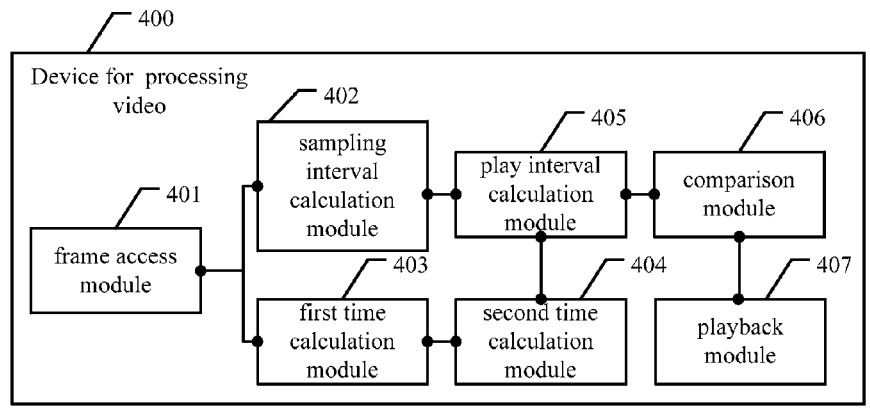
Fig. 4-a
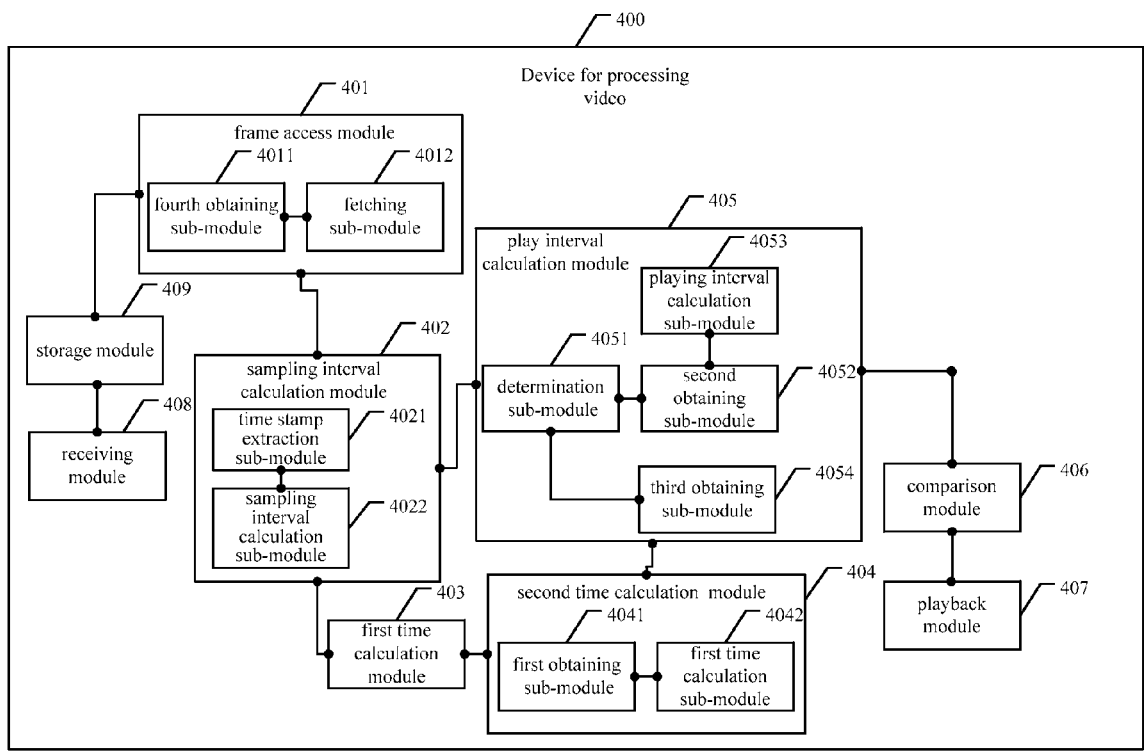
Fig. 4-b

METHOD AND DEVICE FOR VIDEO PROCESSING

The present application is a continuation of International Application No. PCT/CN2013/089239, filed on Dec. 12, 2013, which claims the priority to Chinese Patent Application No. 201310169074.3, entitled "METHOD AND DEVICE FOR VIDEO PROCESSING", filed on May 9, 2013 with State Intellectual Property Office of People's Republic of China, which are hereby incorporated by reference in their entirety.

TECHNICAL FIELD

The disclosure relates to the video technology, and in particular, to a method and a device for processing a video.

BACKGROUND

With the rapid development of the network technology and popularity of network enabled devices, such as mobile phones, tablet computers, laptops, and other such terminals, popularity and demand for video call software in such terminals has also seen a rapid increase. Video call software enables a video of a counterpart device being used in a phone call to be displayed in real time during the call.

A mobile terminal, acting as a receiver, may receive, through a network, image frames of the video sent from a sender device. The receiver may use the received image frames to playback the video.

However, such video playback may not be adaptive to network delays and other factors related to the network used by the mobile terminal. This may adversely affect real-time performance of the video, such as smoothness during playback.

SUMMARY

A method and a device for processing a video are provided that enable playback of a current image frame of a video by dynamically timing the current image frame based on the network delay. Thus, real-time performance of the video call may be maintained.

The various embodiments described throughout this document describe technical solutions to solve at least one of the technical problems described above.

In an aspect, a method for processing a video is provided. The method may include at least the following steps. The method may involve accessing, retrieving, obtaining, or fetching, from a buffer queue, an ith image frame of the video, where the variable i is a natural number.

The method may further involve calculating a sampling interval of the ith image frame between a time point at which the ith image frame is sampled and another time point at which an (i−1)th image frame was sampled. The (i−1)th image frame of the video is the image frame fetched from the buffer queue immediately before, or prior to the ith image frame;

A waiting time of the ith image frame may be calculated. The waiting time may start when the ith image frame of the video is added into the buffer queue and may end when the ith image frame of the video is fetched from the buffer queue. A regulated waiting time of the ith image frame may be calculated based on the waiting time of the ith image frame and a regulated waiting time of the (i−1)th image frame.

The method may further involve determining a playing interval of the ith image frame based on the regulated waiting time of the ith image frame, the sampling interval of the ith image frame, and a preset waiting delay.

It may be determined whether duration between a current time point and a time point at which the (i−1)th image frame of the video starts playback is shorter than the playing interval of the ith image frame. If the duration is not shorter than the playing interval of the ith image frame, the ith image frame of the video may be played back at the current time point.

In another aspect, a device for processing a video is provided. The device may include at least, a frame access module, a sampling interval calculation module, a first and a second time calculation module, a play interval calculation module, a comparison module, and a playback module.

The frame access module may access, from a buffer queue, an ith image frame of the video, where the variable i is a natural number.

The sampling interval calculation module may calculate a sampling interval of the ith image frame. The sampling interval may be the interval between a time point at which the ith image frame of the video is sampled and another time point at which an (i−1)th image frame of the video is sampled. The (i−1)th image frame of the video is the image frame fetched from the buffer queue immediately prior to the ith image frame.

The first time calculation module may calculate a waiting time of the ith image frame. The waiting time may start when the ith image frame of the video is added to the buffer queue and may end when the ith image frame of the video is fetched from the buffer queue. The second time calculation module may calculate a regulated waiting time of the ith image frame based on the waiting time of the ith image frame and a regulated waiting time of the (i−1)th image frame.

The play interval calculation module may calculate a playing interval of the ith image frame based on the regulated waiting time of the ith image frame, the sampling interval of the ith image frame, and a preset waiting delay.

The comparison module may determine a duration between a current time point and a time point at which the (i−1)th image frame of the video starts to be played. The comparison module may further determine whether the duration is shorter than the playing interval of the ith image frame.

The playback module may play the ith image frame of the video at the current time point if the duration is not shorter than the playing interval of the ith image frame.

In yet another aspect, a non-volatile storage medium including computer-executable instructions may be provided. The computer-executable instructions, when executed by a processor, enable the processor to implement a method, such as the foregoing method, for processing a video.

Embodiments according to the technical solutions have at least the following advantages.

The ith image frame of the video may be fetched from the buffer queue. The sampling interval of the ith image frame, between time points at which the ith and the (i−1)th image frame of the video are sampled may be calculated. The waiting time of the ith image frame may be calculated, the waiting time being the duration between the ith image frame being put into the buffer queue and the ith image frame being fetched from the buffer queue. The regulated waiting time of the ith image frame may then be calculated based on the waiting time of the ith image frame and a regulated waiting time of the (i−1)th image frame. The playing interval of the ith image frame may be calculated based on the regulated waiting time of the ith image frame, the sampling interval of the ith image frame, and the preset waiting delay. It may then be determined whether the duration between the current time point and the time point at which the (i−1)th image frame of the video started playback is shorter than the playing interval of the ith image frame. The ith image frame of the video may be played back at the current time point if the duration is not shorter than the playing interval of the ith image frame. Accordingly, a playing interval may be set for each image frame of a video based on the regulated waiting time, the sampling interval, and the preset waiting delay. Thus, the current network delay may be compensated through the regulated waiting time. The buffer time of the current image frame of the video may be determined adaptively, as per the network delay, by setting the current playing interval of each frame in the video. Therefore, the images of the video may be displayed smoothly, and a stable playback of the images of the video is maintained. In addition, after the playing interval is set, the duration between the current time point and the time point at which a previous image frame of the video is played may be determined and compared with the set playing interval. In case the determined duration is longer than or equal to the set playing interval, the current image frame of the video may be played at the current time point. Therefore, the timing for playing the current image frame of the video may be dynamically adjusted so that the received image of the video is played in time and the real-time performance of the video call is improved.

BRIEF DESCRIPTION OF THE DRAWINGS

For explaining technical solutions and embodiments, drawings used in the description are explained briefly hereinafter. The drawings in the description are merely some possible embodiments, and other drawings may be obtained by those skilled in the art based on these drawings.

FIG. 4-a is a schematic structure diagram of an example device for processing a video.

FIG. 4-b is a schematic structure diagram of an example device for processing a video.

DETAILED DESCRIPTION OF THE EMBODIMENTS

Figure 1:
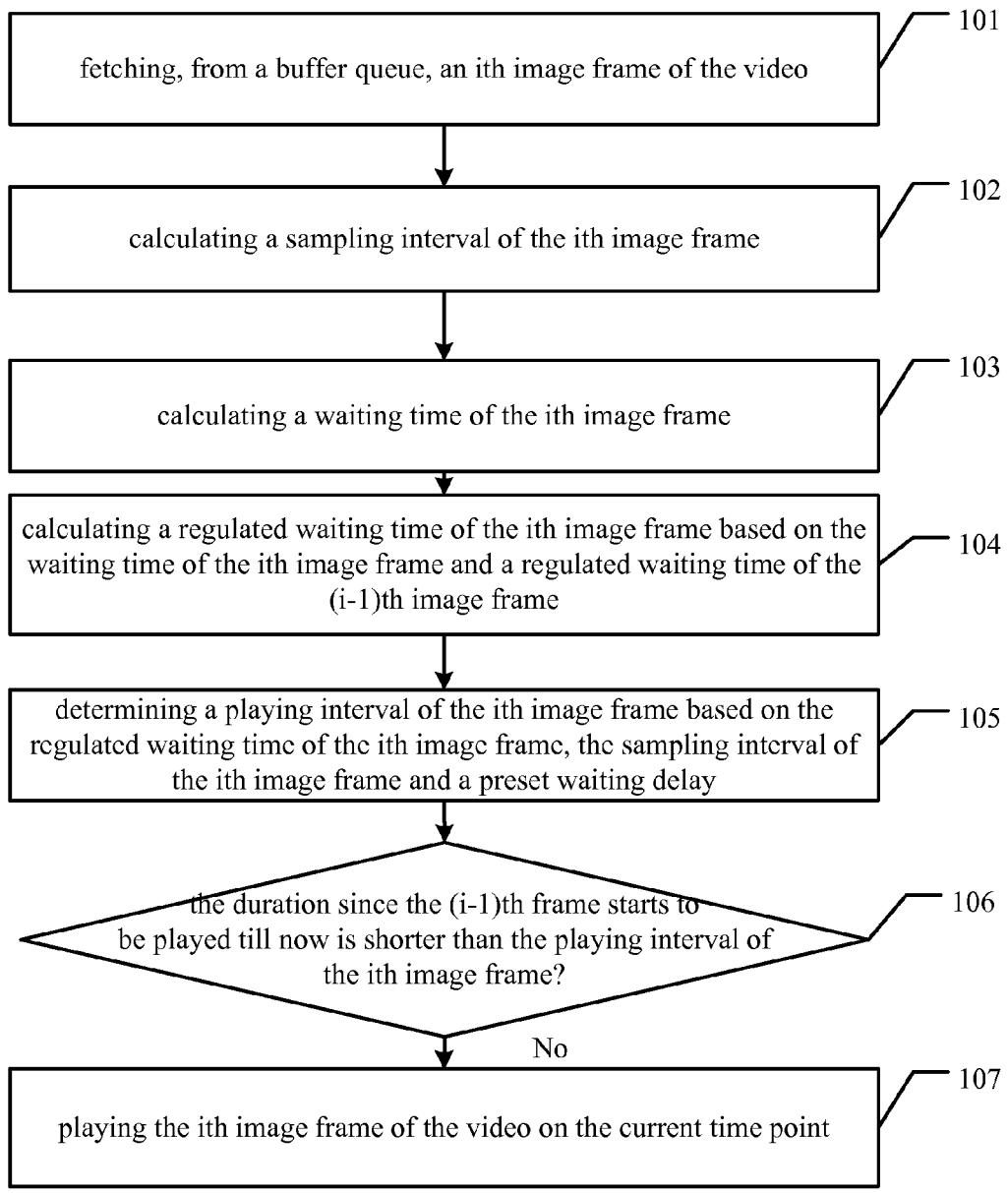
FIG. 1 is a flowchart of an example method for processing a video.

A method and a device for processing a video are provided. The method and the device may dynamically adjust the timing for playing a current image frame of a video based on a network delay, and ensure, and/or maintain real-time performance of a video call.

The technical solutions according to embodiments described hereinafter are described in conjunction with the drawings. The described embodiments are merely some of the possible embodiments. Any other embodiment obtained by those skilled in the art based on the embodiments described should fall into the scope of protection of the present disclosure.

Terms of "first", "second", etc., used in the specification, claims and the drawings, are intended to distinguish similar objects, rather than to describe a specific order or precedence. It should be understood that, those terms are applied, during describing the embodiments, to distinguish the objects having same attributes, and those terms may be interchangeable under proper circumstance. In addition, terms of "include", "comprise" and any transformation thereof are intended to be non-exclusive. Further, procedures, methods, systems, products or devices including a series of units are not limited to the units expressly listed, and inherent units or the units which are not expressively listed may be included in the procedures, methods, systems, products or devices.

The embodiments are described respectively as follows.

A method for processing a video is provided according to an embodiment. The method may include fetching, from a buffer queue, an ith image frame of the video. The variable i is a natural number. A sampling interval of the ith image frame may be calculated. The sampling interval may be a time period, or duration between a time point at which the ith image frame of the video is sampled and a time point at which an (i−1)th image frame of the video is sampled. The (i−1)th image frame of the video is the image frame fetched from the buffer queue immediately before the ith image frame. The method may further involve calculating a waiting time of the ith image frame. The waiting time may be a time period, or duration between measured starting with the ith image frame of the video being put into the buffer queue and ending with the ith image frame of the video being fetched from the buffer queue. Further, a regulated waiting time of the ith image frame may be calculated based on the waiting time of the ith image frame and a regulated waiting time of the (i−1)th image frame. A playing interval of the ith image frame may be identified based on the regulated waiting time of the ith image frame, the sampling interval of the ith image frame, and a preset waiting delay. Further, a duration between a current time point and a time point at which the (i−1)th image frame of the video starts to be played may be calculated. The calculated duration may be compared to, so as to determine if it is shorter than, the playing interval of the ith image frame. If the duration is not shorter than the playing interval of the ith image frame, the ith image frame of the video may be played back at the current time point.

FIG. 1 is an example method for processing a video. The method may include at least steps 101-107.

The step 101 may involve fetching, from a buffer queue, an ith image frame of the video. The variable i may be a natural number.

The buffer queue may store images of the video received by a receiver through a network. The video may be transmitted by a sender device. There may be a single image frame or may be multiple image frames of the video stored in the buffer queue. The number of image frames in the buffer queue may depend on the sampling interval of the sender and a network delay. For purpose of convenient description in this document, a current image frame of the video and an image frame fetched immediately before the current image frame, are referred to as a ith image frame, and an (i−1)th image frame respectively. The variable i is a natural number. Variables i and i−1 are generally used to represent the current frame and the frame fetched immediately before the current frame. Other representation may be possible by defining other variables. For example, variables s and t, such that variables s and t meet the condition s=t+1, may be used to represent the current frame and the frame fetched immediately before the current frame, among various other non-limiting representations.

In an example, before the ith image frame of the video is fetched from the buffer queue, the images of the video may be stored in the buffer queue. The receiver may receive, through the network, the images of the video sent by the sender. Each time an image frame is received, the received image frame may be added into the buffer queue. In other words, each time the receiver receives, through the network, an image frame of the video sent by the sender, the image frame is added into the buffer queue. An event, corresponding to the image frame being added into the buffer queue may be generated and recorded. Similarly, another event may be generated and recorded corresponding to the image frame being fetched, retrieved, and or accessed, from the buffer queue. The generated events may identify a time stamp at which the event was generated. In addition, when each image frame is sent from the sender, the sender may indicate a sampling time stamp, for example, as part of attribute information of the image frame. The sampling time stamp may represent a time point at which the image frame is sampled.

In an example, in case the buffer queue includes multiple image frames, the image frame added into the buffer queue the earliest may be selected as the ith image frame. Based on the event generated when an image frame is added into the buffer queue, the image frame from among those stored in the buffer queue, that was stored the earliest, may be identified. In one example, the image frames may be fetched from the buffer queue in a first-in-first-out manner, i.e., the image frame which is put into the buffer queue earliest may be fetched first from the buffer queue.

The step 101 and the following steps fetch, process, and playback the ith image frame of the video from the buffer queue. These steps represent part of, or one cycle of the steps performed to process the complete video. The video may include additional image frames, such as the (i−1)th image frame, an (i−2)th image frame, and various other image frames of the video in the buffer queue. The other image frames in the buffer queue may be circularly processed similar to the ith image frame of the video. Similarly, an (i+1)th image frame of the video in the buffer queue may also be circularly processed similar to the ith frame. The present disclosure uses the ith image frame of the video for explaining the technical solutions, however other frames, such as the (i−1)th frame, or the (i+1)th frame may be used for this purpose, without any limitations.

The step 102 may involve calculating a sampling interval of the ith image frame. The sampling interval may be a duration between a time point at which the ith image frame is sampled and another time point at which the (i−1)th image frame is sampled. The (i−1)th image frame is the image frame fetched from the buffer queue immediately before the ith image frame.

In an example, the (i−1)th image frame of the video may be an image frame obtained during a previous processing procedure before processing the ith image frame of the video. For convenient illustration of the order of the previous image frame and a current image frame, the image frame obtained during the previous processing procedure is defined as the (i−1)th image frame of the video.

Typically, a fixed number of image frames of the video are buffered in advance and then played back based on sampling intervals. Therefore, in case multiple image frames of the video are buffered in advance or if the network delay is large, a large accumulated delay may be introduced. Thus, real-time performance of a video call may be affected. However, according to the technical solutions described in the present disclosure, after calculating the sampling interval, the ith image frame may not be played back directly as per the sampling interval. Instead, the sampling interval may be taken as a basis for setting a playing interval of the ith image frame.

The step 103 may involve calculating a waiting time of the ith image frame. The waiting time may be a duration, or time period starting with the ith image frame being added into the buffer queue and ending with the ith image frame being fetched from the buffer queue.

The event generated when the image frame is added, or entered into the buffer queue, the event generated when the image frame is fetched from the buffer queue, may be used to calculate the waiting time. The waiting time may represent a duration for which the image frame is waiting in the buffer queue. The waiting time may be obtained by calculating a difference between the fetching event and the entering event. With the waiting time of the ith image frame, a current network delay may be identified. The current network delay may be deemed small if the waiting time of the ith image frame is short and the current network delay may be deemed as large if the waiting time of the ith image frame is long, with respect to a predetermined threshold waiting time.

The step 104 may involve calculating a regulated waiting time of the ith image frame based on the waiting time of the ith image frame and a regulated waiting time of the (i−1)th image frame.

In an example, the regulated waiting time of the ith image frame may be calculated by performing the steps 101-104 on the ith image frame as well as a set of previous image frames of the video. For example, the regulated waiting time of the (i−1)th image frame may be calculated; and if only an initial regulated waiting time is assigned to the (i−1) the image frame, a regulated waiting time of the (i−2)th frame, a regulated waiting time of the (i−3)th frame, and other previous frames, may be calculated through multiple iterations and updates. For example, when the variable i equals 1, an initial regulated waiting time may be used. A regulated waiting time of the $1^{st}$ frame may be calculated based on a waiting time of the $1^{st}$ frame and the initial regulated waiting time; when the variable i is updated as 2, a regulated waiting time of the $2^{nd}$ frame may be calculated based on a waiting time of the $2^{nd}$ frame and the regulated waiting time of the $1^{st}$ frame.

In an exemplary implementation, the regulated waiting time may be a dynamically adjustable waiting time, referred to a dynamic average waiting time. The dynamic average waiting time which may be a weighted average value of the waiting time of the current image frame and waiting time(s) of previous frame(s). Those skilled in the art may understand that the regulated waiting time may be determined in any other manner and the present disclosure is not limited in this aspect.

According to the embodiment of the invention, a trend of the current network delay may be preliminarily obtained based on the waiting time of the ith image frame and the regulated waiting time of the (i−1)th image frame. The regulated waiting time of the ith image frame may be calculated, and the current network delay may be identified through the regulated waiting time of the ith image frame. The trend of the current network delay may be profiled based on a waiting time of the current frame and a regulated waiting time of a previous frame. The calculated regulated waiting time of the ith image frame may then be used for calculating the playing interval of the ith image frame. The playing interval of the ith image frame may conform to the situation of the current network delay, and thus adapt the video playback according to the network delay.

The step 105 may involve obtaining the playing interval of the ith image frame based on the regulated waiting time of the ith image frame, the sampling interval of the ith image frame, and a preset waiting delay.

In an example, the preset waiting delay may be used for calculating the playing interval of the ith image frame. The preset waiting delay may reflect both a tolerable threshold of the waiting time and an effect on the setting of the playing interval of the ith image frame based on hardware performance of the receiver. For example the value of the waiting delay may be set to a lower threshold value, if the hardware performance of the mobile device is geared for video playback, while the value of the waiting delay may be set larger threshold value if the tolerable threshold of the waiting time is higher.

The step 106 may involve determining whether the duration between a current time point and a time point at which the (i−1)th image frame of the video starts to be played is shorter than the playing interval of the ith image frame.

The length (duration) of passed time is obtained by timing from the time point at which the (i−1)th image frame of the video starts to be played to the current time point. It may then be determined whether the obtained duration is shorter than the playing interval of the ith image frame. If the obtained duration is longer than or equal to the playing interval of the ith image frame, step 107 may be triggered to be executed.

In one example, the obtained duration being shorter than the playing interval of the ith image frame may indicate that the time during which the ith image frame of the video is waiting to be played, does not exceed the playing interval of the ith image frame. Thus, in order to ensure that the video playback is smoothly displayed, the ith image frame may continue waiting. The ith image frame may be played back at a time point when a duration equal to the playing interval of the ith image frame is elapsed since the (i−1)th image frame starts to be played.

The step 107 may involve playback of the ith image frame at the current time point, in response to the duration between the current time point and the time point at which the (i−1)th image frame of the video starts to be played being longer than or equal to the playing interval of the ith image frame.

The duration between the current time point and the time point on which the (i−1)th image frame of the video starts to be played being longer than or equal to the playing interval of the ith image frame may indicate that the time during which the ith image frame of the video is waiting to be played, exceeds the playing interval of the ith image frame. Therefore, the ith image frame of the video may be played immediately. Thus, the timing for playing a current image frame of the video may be dynamically adjusted so that the video is played back in time and the real-time performance of the video call is maintained and/or improved.

The processing procedure for the ith image frame of the video fetched from the buffer queue is described with the steps 101-107. The steps 101-107 may be repeated after finishing the processing on the ith image frame for an (i+1)th image frame. Thus, in further iterations the variable i in the steps 101-107 is updated and replaced with i+1, i+2, and so on. An (i+2)th image frame of the video may be fetched after finishing processing the (i+1)th image frame of the video and so on. Accordingly, images of the video are processed continuously.

Thus, a method providing technical solutions of this disclosure may involve fetching the ith image frame of the video the buffer queue and calculating the sampling interval of the ith image frame. The sampling interval may be the duration between the time points at which the ith image frame and the (i−1)th image frame of the video are sampled. The waiting time of the ith image frame may also be calculated. The waiting time may represent the time duration between the time points the ith image frame is put into the buffer queue and the ith image frame is fetched from the buffer queue. Further, the regulated waiting time of the ith image frame may be calculated based on the waiting time of the ith image frame and the regulated waiting time of the (i−1)th image frame. The playing interval of the ith image frame may be obtained based on the regulated waiting time of the ith image frame, the sampling interval of the ith image frame, and the preset waiting delay. The playing interval of the ith frame may be compared with a calculated duration between the current time point and the time point on which the (i−1)th image frame of the video starts to be played. If the calculated duration is shorter than the playing interval of the ith image frame, the ith image frame may be played back at the current time point. Accordingly, a playing interval may be set for each image frame of a video based on the regulated waiting time, the sampling interval, and the preset waiting delay. Therefore, the current network delay may be identified and compensated using the regulated waiting time, and the buffer time of the current image frame of the video may be determined adaptively by setting the current playing interval of each frame. The images of the video may thus, be displayed smoothly, and a stable play of the images of the video is ensured and/or maintained. In addition, after the playing interval is set, the duration between the time point at which a previous image frame of the video is played and the current time point, may be compared with the set playing interval, and in case the duration between the time point on which the previous image frame of the video is played and the current time point is longer than or equal to the set playing interval, the current image frame of the video may be played back at the current time point. Thus, the timing for playing the current image frame may be dynamically adjusted so that the received image of the video is played in time and the real-time performance of the video call is maintained and/or improved.

Figure 2:
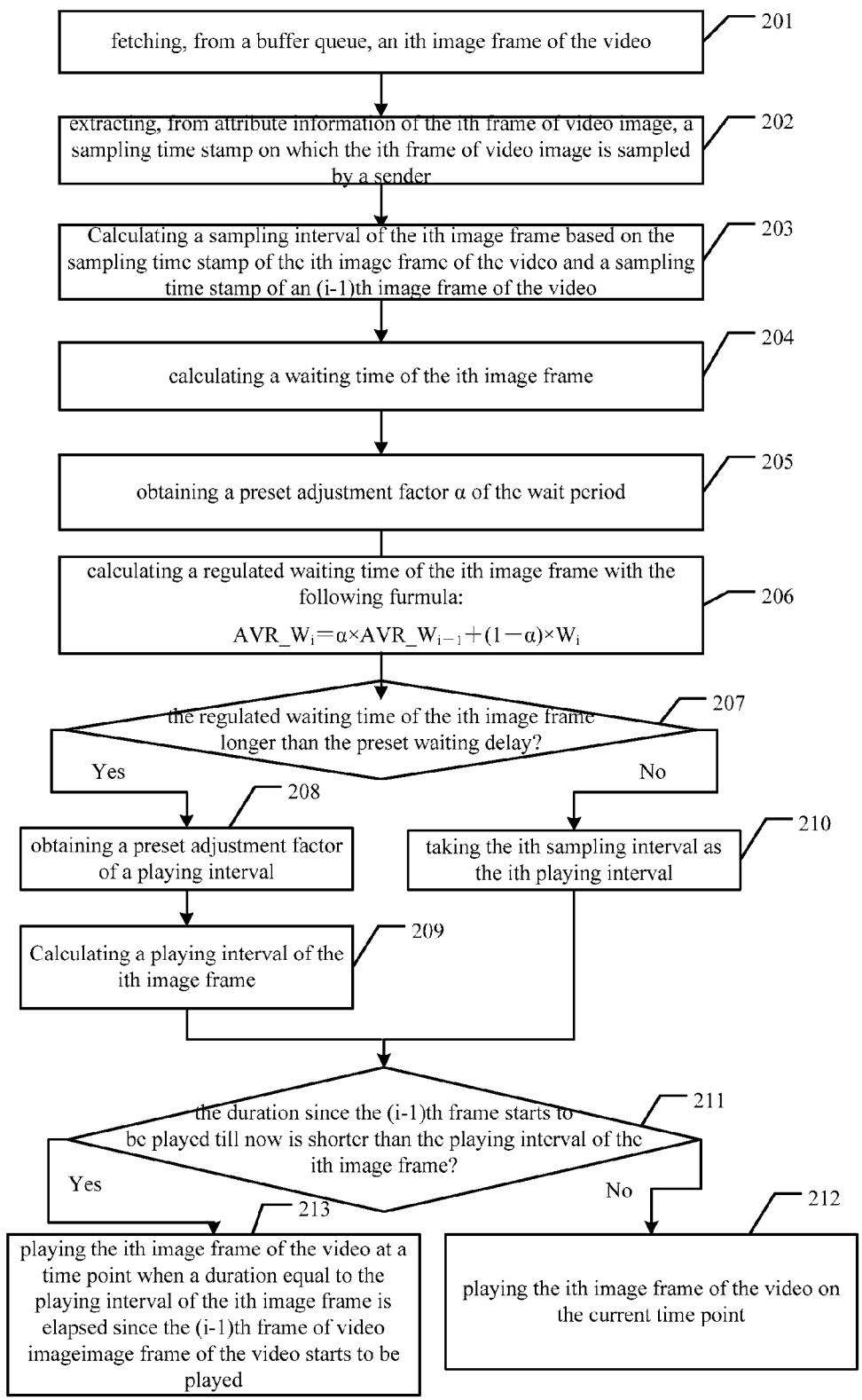
FIG. 2 is a flowchart of an example method for processing a video.

FIG. 2 is a flowchart of an example method for processing a video. The example method may include at least steps 201-213.

The step 201 may involve fetching, from a buffer queue, an ith image frame of the video. The variable i is a natural number.

The buffer queue may store images, or image frames of the video received by a receiver through network. At a given point in time, the buffer queue may contain only one image frame or multiple image frames of the video depending on factors such as a network delay, or a sampling interval used by a sender device, or any other such parameters.

The step 202 may involve extracting a time stamp from attribute information of the ith image frame of the video. The time stamp may provide a time point at which the ith image frame of the video is sampled by the sender device.

The step 203 may involve calculating a sampling interval of the ith image frame. The sampling interval may be calculated based on the time stamp of the ith image frame and a time stamp of an (i−1)th image frame of the video.

When an image frame of the video is sent from the sender, the sender may indicate a corresponding time stamp of the image frame in the attribute information of the image frame. The time stamp represents a time point at which the image frame of the video is sampled at the sender. By subtracting the time stamp of the (i−1)th image frame from the time stamp of the ith image frame, the sampling interval of the ith image frame may be obtained.

The step 204 may involve calculating a waiting time of the ith image frame. The waiting time may start when the ith image frame is added into the buffer queue and may end when the ith image frame is fetched from the buffer queue. The waiting time of an image frame may indicate a length of time for which the image frame is waiting in the buffer queue. The waiting time may be calculated as the difference between time points corresponding to the image frame being fetched from and being added to the buffer queue.

An event corresponding to an image frame being added to the buffer queue may be generated when the image frame is added into the buffer queue. Additionally, an event corresponding to an image frame being fetched from the buffer queue may be generated when the image frame is fetched from the buffer queue.

The step 205 may involve obtaining a preset adjustment factor α for the waiting time. The preset adjustment factor α may satisfy a condition, such as 0<α<1.

In an example, the preset adjustment factor for the waiting time may be used to correct the value of the regulated waiting time $AVR\_W_i$ of the ith frame. The preset adjustment factor may thus be referred to as a weight of the regulated waiting time $AVR\_W_{i-1}$ of the (i−1)th frame. The adjustment factor for the waiting time may be set based on the waiting times and the regulated waiting times calculated for a set of image frames previous to the current frame. The regulated waiting time may be altered by the adjustment factor relative to the delay corresponding to a frame among the multiple previous frames. For example, if one of the previous frames experiences a larger delay, the regulated waiting time may be larger. Such a technical problem, of dependence on the network delay experienced by a prior frame may be avoided by setting the adjustment factor for the waiting time based on historical statistical information. Thus, performance of the video playback may be maintained.

The step 206 may involve calculating a regulated waiting time of the ith image frame. The regulated waiting time may be calculated according to the following formula:

$$AVR\_W_i = \alpha \times AVR\_W_{i-1} + (1-\alpha) \times W_i;$$

where $AVR\_W_i$ represents the regulated waiting time of the ith image frame, $AVR\_W_{i-1}$ represents a regulated waiting time of the (i−1)th image frame, and $W_i$ represents the waiting time of the ith image frame.

In an example, the regulated waiting time may be dynamically adjustable, and may be referred to as a dynamic average waiting time. The dynamic average waiting time may be a weighted average value of the waiting time of the current image frame and the waiting time(s) of previous frame(s).

The step 207 may involve determining whether the regulated waiting time of the ith image frame is longer than the preset waiting delay.

If the regulated waiting time of the ith image frame is longer than the preset waiting delay, the steps 208 and 209 may be executed; else if the regulated waiting time of the ith image frame is shorter than or equal to the preset waiting delay, the step 210 may be executed.

The step 208 may involve obtaining a preset adjustment factor for the playing interval.

The step 209 may involve calculating a playing interval of the ith image frame. The playing interval may be calculated based on the adjustment factor for the playing interval and the sampling interval of the ith image frame.

The regulated waiting time of the ith image frame may be compared to the preset waiting delay to determine which is of longer duration. The playing interval of the ith image frame may be varied based on the result of the determination. For example, if the regulated waiting time of the ith image frame is longer than the preset waiting delay, it may be an indication that the length of time for which the ith image frame is waiting to be played is too long, and that the waiting time should be reduced in order to decrease an accumulated delay. The preset adjustment factor for the playing interval may be obtained, and the playing interval of the ith image frame may be calculated based on the adjustment factor for the playing interval and the sampling interval of the ith image frame. The playing interval of the ith image frame may be calculated with a formula, such as:

$$PlayInterval_i = SampleInterval_i \times \beta;$$

where $PlayInterval_i$ represents the playing interval of the ith image frame, $SampleInterval_i$ represents the sampling interval of the ith image frame, and β represents the adjustment factor for the playing interval. β value may be such that 0<β<1.

The adjustment factor for the playing interval may represent a weight of $SampleInterval_i$ so as to adjust, or correct the value of $PlayInterval_i$. The adjustment factor for the playing interval may be set based on regulated waiting times and waiting times of multiple previous frames. The time during which an image frame of the video is waiting to be played may be longer than a threshold, such that the quality of the video playback to be choppy, or non-continuous, if one of the image frames among the multiple previous frames is delayed by a certain length of time. The degradation may be avoided by setting the adjustment factor for the playing interval based on historical statistical information, and the image frame of the video may be ensured to be played at a prescribed time so that the video playback is continuous, without any interruptions, or stoppage.

The step 210 may assign the sampling interval of the ith image frame as the playing interval of the ith image frame.

If the regulated waiting time of the ith image frame is shorter than or equal to the preset waiting delay, it may be an indication that the length of time for which the ith image frame of the video is waiting to be played is shorter than a particular interval and that, the playing interval of the ith image frame may be used as is without a correction with the adjustment factor for the playing interval. In such a case, the sampling interval of the ith image frame may be assigned as the playing interval of the ith image frame.

The step 211 may involve determining whether the time elapsed since the time point at which the (i−1)th image frame of the video started playback is shorter than the playing interval of the ith image frame.

The length (duration) of the elapsed time may be obtained by calculating a difference between the current time and the time point at which the (i−1)th image frame started to be played. The elapsed time may then be compared with the playing interval of the ith image frame to determine the shorter of the two durations. If the elapsed time is longer than or equal to the playing interval of the ith image frame, the step 212 may be executed; else if the elapsed time is shorter than the playing interval of the ith image frame, the step 213 may be executed.

The step 212 may involve playing the ith image frame of the video at the current time point, in response to the elapsed time being longer than or equal to the playing interval of the ith image frame.

The elapsed time being longer than or equal to the playing interval of the ith image frame may indicate that the time for which the ith image frame of the video is waiting to be played exceeds the playing interval of the ith image frame. Accordingly, the ith image frame of the video may be played immediately. Therefore, in one example, the timing for playing a current image frame of the video may be dynamically adjusted. Thus, the received images of the video are played in time and the real-time performance of the video call of the user is maintained and/or improved.

In the step 213, in the case that the elapsed time since the start of the (i−1)th image frame playback being shorter than the playing interval of the ith image frame, the ith image frame of the video may be played at a time point after the playing interval of the ith image frame is elapsed since the (i−1)th frame of video mage frame of the video starts to be played.

The elapsed time since the (i−1)th image frame starts playback is shorter than the playing interval of the ith image frame may indicate that the time for which the ith image frame is waiting to be played does not exceed the playing interval of the ith image frame. Therefore, for smooth playback of the video, the ith image frame of the video may continue waiting and may be played at a time point after the playing interval of the ith image frame is elapsed since the start of (i−1)th image frame playback.

Accordingly, firstly the ith image frame of the video may be fetched from the buffer queue. The sampling interval of the ith image frame may be calculated. The sampling interval may be the difference between the time points at which the ith image frame and the (i−1)th image frame of the video are sampled. The waiting time of the ith image frame may also be calculated. The waiting time may be the difference between the time points when the ith image frame is added into the buffer queue and when the ith image frame is fetched from the buffer queue. The regulated waiting time of the ith image frame may then be calculated based on the waiting time of the ith image frame and the regulated waiting time of the (i−1)th image frame. The playing interval of the ith image frame may also be calculated based on the regulated waiting time of the ith image frame, the sampling interval of the ith image frame, and the preset waiting delay. The time elapsed since the start of the playback of the (i−1)th image frame may be compared with the playing interval of the ith image frame. The ith image frame is started to be played at the current time point in response to the elapsed time not being shorter than the playing interval of the ith image frame. In an example, a playing interval may be set for each image frame based on the regulated waiting time, the sampling interval, and the preset waiting delay. Therefore, the current network delay may be compensated through the regulated waiting time. The buffer time of the current image frame of the video may be determined adaptively by setting the current playing interval of the each frame. Consequently, the images of the video may be displayed smoothly and a steady and continuous video playback may be maintained. In addition, after the playing interval is set, the in case the time elapsed since the previous image frame of the video is played is longer than or equal to the set playing interval, the current image frame of the video may be played at the current time point. Thus, the timing for playing the current image frame of the video may be dynamically adjusted. Accordingly, the received image frames of the video may be played in time and the real-time performance of the video call maintained and/or improved.

Figure 3:
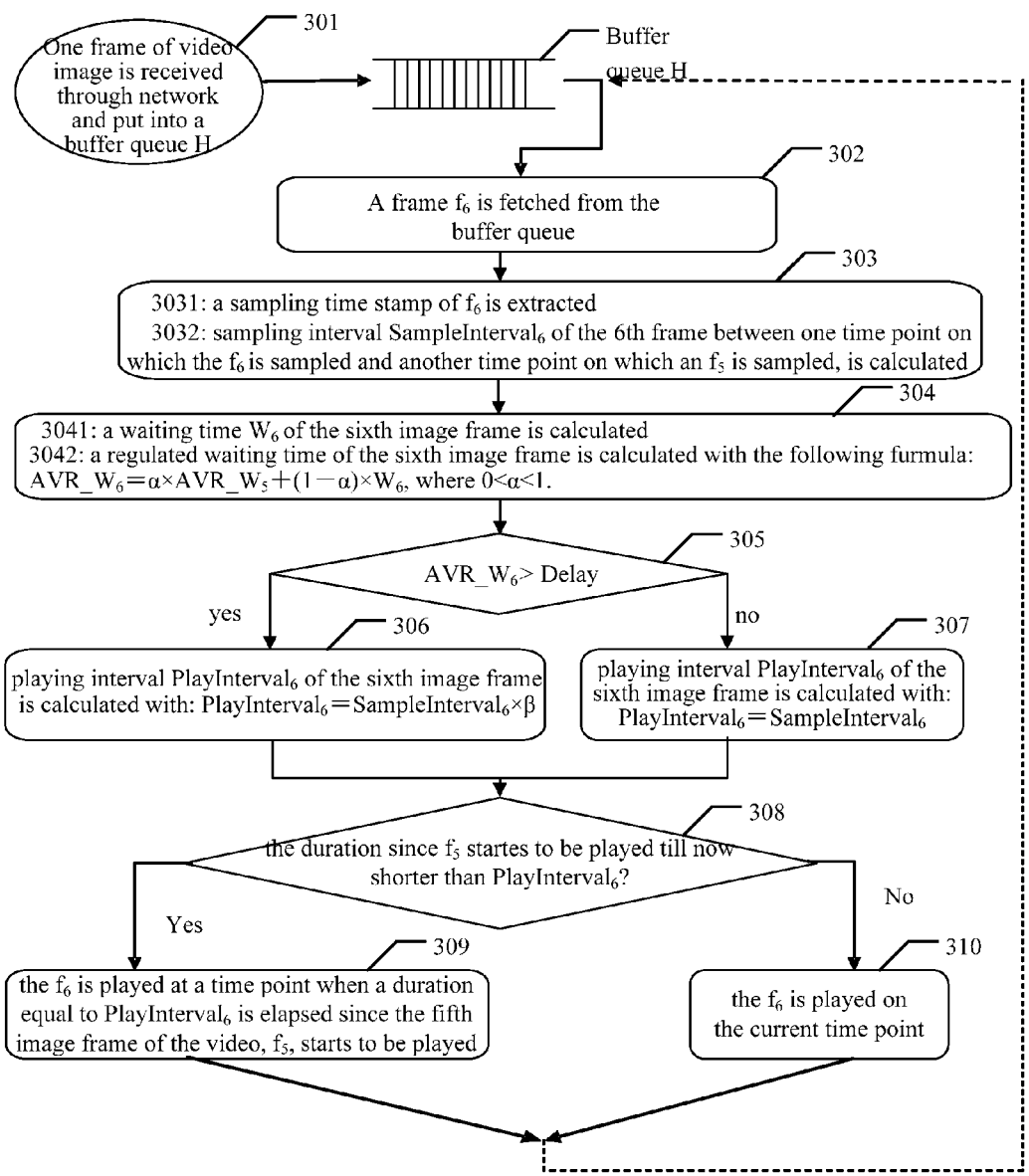
FIG. 3 is a flowchart of an example method for processing a video.

FIG. 3 is a flowchart of an example method for processing a video. The exemplary method may include at least steps 301-310.

In the step 301, image frames of the video sent by a sender may be received through a network. Each image frame received may be added into a buffer queue H. For purpose of explanation, consider that currently, the buffer queue H contains image frames $f_6$, $f_7$, $f_8$ and $f_9$, which correspond respectively to a sixth image frame, a seventh image frame, an eighth image frame, and a ninth image frame of the video. The buffer queue H may contain lesser, more, and/or different image frames of the video, and the above list of frames is just one possible scenario used for description of the exemplary method illustrated by FIG. 3.

In step 302, the sixth image frame of the video may be fetched from the buffer queue. The sixth image frame of the video may be the one added into the buffer queue H the earliest.

The step 303 may include step 3031 and step 3032. In step 3031, a sampling time stamp may be extracted from attribute information of the sixth image frame $f_6$. In step 3032, a sampling interval SampleInterval$_6$ of the sixth image frame may be calculated. The sampling interval may be the temporal interval between a first time point at which the image frame $f_6$ was sampled and a second time point at which an image frame $f_5$ was sampled. The image frame $f_5$ may be the fifth image frame received, i.e. the image frame processed prior to the image frame $f_6$.

The step 304 may include step 3041 and step 3042. In the step 3041, a waiting time $W_6$ of the sixth image frame may be calculated. The starting point of the waiting time $W_6$ may be when the sixth image frame of the video, $f_6$, was added into the buffer queue H and the end point may be when the image frame $f_6$ was fetched from the buffer queue H. In the step 3042, a regulated waiting time AVR\_$W_6$ of the sixth image frame may be calculated. The regulated waiting time may be calculated based on the waiting time $W_6$, such as with the following formula: AVR\_$W_6$=α×AVR\_$W_5$+(1−α)×$W_6$, where 0<α<1. In the example formula, a regulated waiting time AVR\_$W_5$ of the image frame $f_5$ and a preset parameter α is used for the calculation.

In step 305, the regulated waiting time AVR\_$W_6$ of the sixth image frame may be compared with a preset waiting delay referred to as 'Delay'. If AVR\_$W_6$ is longer than Delay, step 306 may be initiated; else if AVR\_$W_6$ is not longer than Delay, step 307 may be initiated. A playing interval PlayInterval$_6$ of the sixth image frame may be calculated using different calculations in steps 306 and 307, based on the result of the comparison.

For example, in step 306, the playing interval PlayInterval$_6$ of the sixth image frame may be calculated with the following formula: PlayInterval$_6$=SampleInterval$_6$×β, where 0<β<1. Following step 306, step 308 may be initiated.

In step 307, the playing interval PlayInterval$_6$ of the sixth image frame may be calculated with the following formula: PlayInterval$_6$=SampleInterval$_6$. Following step 307, step 308 may be initiated.

In step 308, the playing interval PlayInterval$_6$ of the sixth image frame may be compared with time elapsed since the start of playback of the image frame $f_5$. The time elapsed may be calculated as difference between the current time point and a time point at which the playback of the fifth image frame $f_5$ was started. If the elapsed time is shorter than the PlayInterval$_6$, step 309 may be initiated; else if the elapsed time is not shorter than the PlayInterval$_6$, step 310 may be initiated.

In step 309, the image frame $f_6$ may be played at a time point when a duration equal to PlayInterval$_6$ is elapsed since the start of the playback of the fifth image frame $f_5$ of the video.

In step 310, the sixth image frame of the video, $f_6$, may be played at the current time point.

Thus, a playing interval may be set for each image frame of a video based on the regulated waiting time, the sampling interval, and the preset waiting delay. Accordingly, the current network delay may be compensated for using the regulated waiting time. The buffer time of the current image frame of the video, in the above example the image frame $f_6$, may be determined adaptively by setting the current playing interval of the each frame. Consequently, the image frames of the video may be displayed smoothly, and a stable, continuous playback of the video is maintained. In addition, after the playing interval is set, the elapsed time since the time point at which a previous image frame started playback, may be compared with the set playing interval. In case the elapsed time since start of playback of the previous image frame is longer than or equal to the set playing interval, the current image frame of the video may be played at the current time point. Accordingly, the timing for playing the current image frame of the video may be dynamically adjusted so that the received image frame of the video is played back to maintain real-time performance of the video call.

The exemplary methods in the present disclosure are described as a combination of a series of operations. The order of the operations in the description is exemplary and not a limiting aspect, as it is understood that the steps may be performed in other sequence and/or be performed simultaneously.

FIG. 4-a is a schematic structure diagram of an example device for processing a video. The device may include a frame access module 401, a sampling interval calculation module 402, a first time calculation module 403, a second time calculation module 404, a play interval calculation module 405, a comparison module 406 and a playback module 407. Each module may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of memory, for example, that comprises instructions executable with a processor to implement one or more of the features of the module. The instructions may be executable with a processor that may or may not be part of the module. In some examples, each module may just be the portion of the memory that comprises instructions executable with a processor.

The frame access module 401 may fetch, from a buffer queue, an ith image frame of the video. The variable i is a natural number, and the ith frame represents a current image frame to be processed.

The sampling interval calculation module 402 may calculate a sampling interval of the ith image frame. The sampling interval may be the duration between a time point at which the ith image frame of the video is sampled and another time point at which an (i−1)th image frame, i.e. a previous frame of the video is sampled. The (i−1)th image frame of the video may be the image frame fetched from the buffer queue immediately before the ith image frame.

The first time calculation module 403 may calculate a waiting time of the ith image frame. The waiting time may be the duration starting with the ith image frame of the video being added into the buffer queue and ending with the ith image frame of the video being accessed from the buffer queue.

The second time calculation module 404 may calculate a regulated waiting time of the ith image frame. The regulated waiting time may be calculated based on the waiting time of the ith image frame and a regulated waiting time of the (i−1)th image frame.

The play interval calculation module 405 may determine a playing interval of the ith image frame. The playing interval may be calculated based on the regulated waiting time of the ith image frame calculated by the second time calculation module 404, the sampling interval of the ith image frame calculated by the sampling interval calculation module 402, and a preset waiting delay.

The comparison module 406 may compare the time elapsed since start of the playback of the previous image frame (i−1)th image frame, and the calculated playing interval of the ith image frame. The elapsed time may be calculated by the comparison module 406 by calculating a difference between a current time point and the time point at which the playback of the (i−1)th image frame was started. Based on the comparison, the comparison module 406 may determine and output whether the elapsed time since start of playback of the (i−1)th image frame is shorter than the playing interval of the ith image frame.

The playback module 407 may initiate playback of the ith image frame of the video based on the output of the comparison module 406. For example, the playback module 407 may imitate playback of the ith frame at the current time point in response to the elapsed time since start of playback of the (i−1)th image frame being longer than or equal to the playing interval of the ith image frame.

Alternatively, or in addition, in response to the elapsed time since start of playback of the (i−1)th image frame being shorter than the playing interval of the ith image frame, the playback module 407 may play the ith image frame at a time point when a duration equal to the playing interval of the ith image frame is elapsed since the start of playback of the (i−1)th image frame of the video.

FIG. 4-b is a schematic structure diagram of an example device for processing a video. As illustrated in FIG. 4-b, in an example device, the second time calculation module 404 may include a first obtaining sub-module 4041 and a first time calculation sub-module 4042.

The first obtaining sub-module 4041 may obtain a preset adjustment factor $\alpha$ for the waiting time. The adjustment factor $\alpha$ may satisfy a condition such as $0<\alpha<1$. The first time calculation sub-module 4042 may calculate the regulated waiting time of the ith image frame. The regulated waiting time may be calculated with a formula such as $AVR\_W_i = \alpha \times AVR\_W_{i-1} + (1-\alpha) \times W_i$; where the $AVR\_W_i$ represents the regulated waiting time of the ith image frame, the $AVR\_W_{i-1}$ represents the regulated waiting time of the (i−1)th image frame, and the $W_i$ represents the waiting time of the ith image frame.

In an example device, the play interval calculation module 405 may include sub-modules such as, a determination sub-module 4051, a second obtaining sub-module 4052, a playing interval calculation sub-module 4053, and a third obtaining sub-module 4054.

The determination sub-module 4051 may determine whether the regulated waiting time of the ith image frame is longer than the preset waiting delay.

The second obtaining sub-module 4052 may obtain a preset adjustment factor for the playing interval, in response to the regulated waiting time of the ith image frame being longer than the preset waiting delay.

The playing interval calculation sub-module 4053 may calculate the playing interval of the ith image frame based on the adjustment factor and the sampling interval of the ith image frame.

The third obtaining sub-module 4054 may assign the sampling interval of the ith image frame as the playing interval of the ith image frame, in response to the regulated waiting time of the ith image frame being shorter than or equal to the preset waiting delay.

In an example device, the playing interval calculation sub-module 4053 may calculate the playing interval of the ith image frame with a formula such as: $PlayInterval_i = SampleInterval_i \times \beta$; where the $PlayInterval_i$ represents the playing interval of the ith image frame, the SampleInterval$_i$ represents the sampling interval of the ith image frame, β represents the adjustment factor for the playing interval, and β satisfies 0<β<1.

In an example device, the sampling interval calculation module 402 may include a time stamp extraction sub-module 4021 and a sampling interval calculation sub-module 4022.

The time stamp extraction sub-module 4021 may extract, from attribute information of the ith image frame of the video, a time stamp. The time stamp may be a sampling time stamp that marks a time point at which the ith image frame was sampled by a sender device, that captures the video.

The sampling interval calculation sub-module 4022 may calculate the sampling interval of the ith image frame. The sampling interval may be calculated based on the respective time stamps of the ith image frame and the (i−1)th image frame of the video. For example, a difference between the time stamps of the ith and (i−1)th time frame may be the sampling interval.

An example device 400 for processing a video may further include a receiving module 408 and a storage module 409.

The receiving module 408 may receive through a network, image frames of the video sent by the sender device. The sender device may capture the video via a camera, or any other video capture device, or may transmit a previously recorded video.

The storage module 409 may store a buffer queue, and any other data during the processing of the video by the device 400. For example, each image frame of the video received by the receiving module 408 may be added into the buffer queue.

In an example device 400, the frame access module 401 may include a fourth obtaining sub-module 4011 and a fetching sub-module 4012.

The fourth obtaining sub-module 4011 may select an image frame as the current image frame for processing from among the image frames stored the buffer queue. For example, in case the buffer queue includes multiple image frames of the video, the fourth obtaining sub-module 4011 may select the image frame which was added the earliest in the buffer queue.

The fetching sub-module 4012 may fetch, or access the selected image frame from the buffer queue. For example, the image frame which was added into the buffer queue the earliest, selected as the ith image frame, i.e. the current image frame, may be fetched for processing by the fetching sub-module 4012.

Accordingly, in an example device the ith image frame i.e. current image frame to be processed of the video may be fetched from the buffer queue. The sampling interval of the ith image frame may be calculated. The sampling interval may be the duration, or difference between the time points at which the ith image frame the (i−1)th image frame of the video are sampled. The waiting time of the ith image frame may also be calculated. The waiting time may be a period of time starting when the ith image frame of the video was added into the buffer queue and ending when the ith image frame of the video is fetched from the buffer queue. The regulated waiting time of the ith image frame may also be calculated. The regulated waiting time may be based on the waiting time of the ith image frame and the regulated waiting time of the (i−1)th image frame. The playing interval of the ith image frame may be calculated based on the regulated waiting time of the ith image frame, the sampling interval of the ith image frame, and the preset waiting delay. The playing interval of the ith image frame may be compared with the time elapsed since start of playback of the (i−1)th image frame of the video. The time elapsed since the start of playback of the (i−1)th image frame may be calculated as a difference between the current time point and the time point at which the playback of the (i−1)th frame was started. If the calculated elapsed time is not shorter than the playing interval of the ith image frame, the ith image frame of the video may be played at the current time point. Thus, a playing interval of an image frame may be set based on the regulated waiting time, the sampling interval, and the preset waiting delay. The current network delay may be compensated for by the regulated waiting time, and the buffer time of the current image frame may be adaptively adjusted by setting the current playing interval of each frame. Accordingly, the images of the video may be displayed smoothly, and a continuous, stable playback of the images of the video may be ensured. In addition, or alternatively, after the playing interval is set for an image frame, the set playing interval may be compared to the time elapsed since the start of playback of a previous image frame. The previous image frame may be the immediately prior frame that was processed and played back. The elapsed time for this comparison may be calculated by calculating a difference between the current time point and the time point at which the previous image frame playback was started. In the case that the elapsed time since the start of the playback of the previous image frame is longer than or equal to the set playing interval, the current image frame of the video may be played at the current time point. Thus, the timing for playing the current image frame of the video may be dynamically adjusted. Consequently, the received image frames of the video may be played in time to maintain the real-time performance of the video call.

The device 400 may be a terminal device such as a smart phone, tablet computer, e-book reader, Moving Picture Experts Group Audio Layer III Player (MP3 Player), Moving Picture Experts Group Audio Layer IV Player (MP4 Player), laptop, desktop, or any other device that may be used for a video call and/or video playback.

Figure 5:
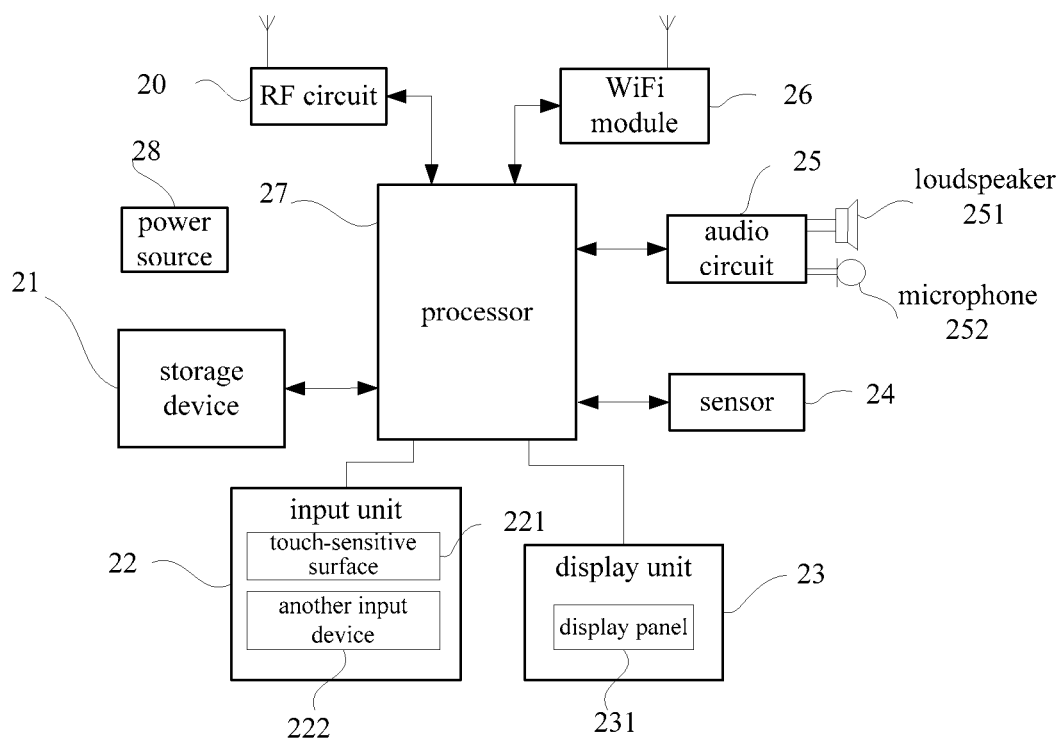
FIG. 5 is a schematic structure diagram of an example terminal device.

FIG. 5 is a schematic structure diagram of an example terminal device. The terminal device may perform the exemplary methods described by the present document. Alternatively, or in addition, the terminal device may be an example device described throughout the present document.

The terminal device may include various components, for example electronic circuitry such as a Radio frequency (RF) circuit 20, a storage device 21 including one or more computer readable storage mediums, an input unit 22, a display unit 23, a sensor 24, an audio circuit 25, a wireless fidelity (WiFi) module 26, a processor 27 including one or more processing cores, a power supply 28, and other such electronic circuitry. The structure of the terminal device shown in FIG. 5 is not intended to be a limiting example. The terminal may include more or less components than those shown in FIG. 5. Also, in other examples of terminal devices, components may be combined or may be in another arrangement than as shown in FIG. 5.

The RF circuit 20 may receive and send a signal such as to receive and/or send messages, such as text messages, chat messages, instant messenger messages, or messages communicated during a phone call. The RF circuit may deliver downlink information of a base station to one or more processors 27 to process, and send uplink data to the base station. The RF circuit 20 may include, but is not limited to, an antenna, at least one amplifier, a tuner, one or more oscillators, a Subscriber Identity Module (SIM) card, a transceiver, a coupler, a Low Noise Amplifier (LNA), a duplexer, and other such circuitry. In addition, the RF circuit 20 may communicate with a network or other devices through wireless communication. A communication standard or protocol may be adopted for the wireless communication, such as Global System of Mobile communication (GSM), General Packet Radio Service (GPRS), Code Division Multiple Access (CDMA), Wideband Code Division Multiple Access (WCDMA), Long Term Evolution (LTE), email, Short Messaging Service (SMS), or any other standard or non-standard, custom communication protocol.

The storage device 21 may be configured to store a software program and module. The processor 27 may execute different applications and process data by running the software program and module stored in the storage device 21. The storage device 21 may include a program storage area and a data storage area, where the program storage area may store an operating system, an application program for at least one function (such as a function of playing audio, a function of displaying image, etc.), or any other function. The data storage area may store data, such as audio data, telephone book, or any other data that may be generated and/or used during operation of the terminal device. In addition, or alternatively, the storage device 21 may be a random access memory, a nonvolatile storage such as at least one of a magnetic disk storage, flash disk, or solid state volatile storage. The storage device 21 may include a storage controller, to enable the processor 27 and the input unit 22 to access data on the storage device 21.

The input unit 22 may receive user input, such as an input number or input character information, and generate a signal input through a keyboard, a mouse, an operating rod, an optical input device or a trackball, where the signal is associated with user configuration and function control. The input unit 22 may include a touch-sensitive surface 221 and another input device 222. The touch-sensitive surface 221, also known as a touch screen or touch panel, may capture a touch operation performed on or nearby the surface such as an operation performed on or near the touch-sensitive surface 221 by a user with a finger, a stylus or any suitable object or accessory. The touch-sensitive device 221 may drive a corresponding connection device based on a preset program. The touch-sensitive surface 221 may include a touch detection device and a touch controller. The touch detection device may detect a touch location of the user, detect the signal caused by the touch operation, and send the signal to the touch controller. The touch controller may receive touch information from the touch detection device, convert the touch information into coordinates of the touch position, send the coordinates to the processor 27, and receive and execute a command from the processor 27. The touch-sensitive surface 531 may be implemented in many types, such as, a resistance type, an infrared type, a Surface Acoustic Wave type, or any other technology. Besides the touch-sensitive surface 221, the input unit 22 may include another input device 222. The another input device 222 may be one or any combination of physical keyboard, function key (e.g., key for controlling volume, ON/OFF key, etc.), trackball, mouse and operating rod.

The display unit 23 may display information input by the user, information provided to the user and different graphic user interfaces of the terminal device. The graphic user interfaces may include one or any combination of image, text, icons, video, and any other user interface elements. The display unit 23 may include a display panel 231. The display panel 231 may be a Liquid Crystal Display (LCD), an Organic Light-Emitting Diode (OLED), or any other type of a display panel. Furthermore, the touch-sensitive surface 221 may cover the display panel 231, and after the touch operation is detected on or near the touch-sensitive surface 221, the touch operation may be sent to the processor 27 to determine the type of a touch event. The processor 27, in response, may provide a corresponding visual output on the display panel 231 based on the type of the touch event. Although FIG. 5, illustrates the touch-sensitive surface 221 and the display panel 231 as two independent components to achieve input and output, the touch-sensitive surface 221 and the display panel 231 may be integrated together to achieve input and output by one component.

The terminal device may further include at least one kind of sensor 24, such as, optical sensor, motion sensor, or any other sensors. The optical sensor may include an ambient light sensor, a proximity sensor, or other sensors based on light. For example, the ambient light sensor may adjust the brightness of the display panel 231 based on the intensity of ambient light. In another example, the proximity sensor may turn off the display panel and/or a backlight when the terminal is moved near to an ear. Further, the motion sensors may include a gravity acceleration sensor that may detect values of accelerations in all directions, such as along three axes), and detect the value and direction of the gravity when remaining stationary. The gravity acceleration sensor may be used for recognizing posture, or orientation of a mobile phone. For example, a landscape and a portrait orientation, a relevant game, a magnetometer pose calibration or any other such functions. Also, a function related to vibration recognition for example, a pedometer, knocking may be performed using the gravity acceleration sensor. In addition, or alternatively, other sensors, such as, gyroscope, barometer, hygrometer, thermometer, infrared sensor, or other such sensors to measure physical attributes, may be further provided in the terminal device.

The audio circuit 25, a loudspeaker 251 and a microphone 252 may provide an audio interface between the user and the terminal. The audio circuit 25 may transmit an electric signal, converted from received audio data, to the loudspeaker 251, and a voice signal may be converted from the electric signal and output, by the loudspeaker 251. The microphone 252 may convert captured voice signal into an electric signal. The electric signal may be received by the audio circuit 25 and converted into audio data. The audio data may be output to the processor 27 to process and then sent to another terminal device via the RF circuit 20. Alternatively, or in addition, the audio data may be output to the storage device 21 for recording and further processing at a later time. The audio circuit 25 may further include a headset jack through which an external earphone and the terminal may be connected.

WiFi is a technology for short-distance wireless transmission. The terminal device may include a WiFi module 26. With the WiFi module 26, the terminal may enable a user of the terminal device to receive and send network data, such as an email, web page data, streaming media, and other forms of network data. A wireless broadband Internet access may be provided to the user via the WiFi module.

The processor 27, as a control center of the terminal, may be connected to all components of the terminal device via different interfaces, such as cables, buses, and wires. The processor 27 may execute different functions of the terminal device and process data by running or executing the software program and/or module stored in the storage device 21. The processor 27 may invoke the data stored in the storage device 21. The processor 27 may include one or more processing cores. The processor 27 may be integrated with an application processor and a modem processor, where the application processor may be responsible for the operating system of the terminal device, the user interface, the applications, and other such functionality of the terminal device. The modem processor may be responsible for processing communication, such as the network communication that may involve the wireless or wired communication. The modem processor may or may not be integrated in the processor 27.

The terminal device may further include the power supply 28 (such as a battery) that may provide power to all the components. The power supply may be connected to the processor 27 logically through a power management system in order to implement functions of charging management, discharging management, power consumption management, and other such power management functionality. The power supply 28 may further include one or more direct-current or alternating current power supplies, a recharging system, a power failure detection circuit, a power adapter or inverter, a power status indicator, and other such circuitry.

The terminal device may also include, although not shown in FIG. 5, a camera, a Bluetooth module and other such modules. In an example, the display unit of the terminal device may be a touch screen display, and the storage device 21 of the terminal may contain a database. The storage device 21 may store sampling periods, sampling intervals, and statistic regarding frame rate, and other information regarding the image frames of the video. The information may be received or generated during the processing of the image frames.

In an example, if one or more programs are stored in the storage device 21, the one or more processors 27 are configured to execute the one or more programs, where the one or more programs include computer executable instructions. The computer executable instructions may be executed by the one or more processors 27 to perform at least the following steps.

The processors 27 may fetch, from a buffer queue, an ith image frame of the video. The variable i may be a natural number and the ith frame may be the current frame to be processed.

A sampling interval of the ith image frame may be calculated. The sampling interval may be calculated as the difference between the respective time points at which the ith image frame and an (i−1)th image frame of the video are sampled. The (i−1)th image frame of the video is the image frame fetched from the buffer queue immediately before the ith image frame.

A waiting time of the ith image frame may also be calculated. The waiting time may be a time period between the time point at which ith image frame is added into the buffer queue and the time point at which the ith image frame is fetched from the buffer queue.

A regulated waiting time of the ith image frame may also be calculated based on the waiting time of the ith image frame and a regulated waiting time of the (i−1)th image frame.

A playing interval of the ith image frame may be calculated and assigned to the ith image frame based on the regulated waiting time of the ith image frame, the sampling interval of the ith image frame, and a preset waiting delay.

The playing interval assigned to the ith image frame may be compared to the time elapsed since the start of playback of the (i−1)th image frame. The playback of ith image frame may be dynamically adjusted based on the result of the comparison.

For example, if the time elapsed since start of playback of the (i−1)th image frame is not shorter than the playing interval of the ith image frame, the ith image frame of the video may be played at the current time point.

The computer executable instruction of calculating the regulated waiting time of the ith image frame based on the waiting time of the ith image frame and the regulated waiting time of the (i−1)th image frame may include obtaining a preset adjustment factor $\alpha$ for the waiting time, where the adjustment factor $\alpha$ satisfies $0<\alpha<1$.

The regulated waiting time of the ith image frame may be calculated by using a formula such as:

$$AVR\_W_i = \alpha \times AVR\_W_{i-1} + (1-\alpha) \times W_i;$$

where the $AVR\_W_i$ represents the regulated waiting time of the ith image frame, the $AVR\_W_{i-1}$ represents the regulated waiting time of the (i−1)th image frame, and the $W_i$ represents the waiting time of the ith image frame.

The computer executable instruction of calculating the playing interval of the ith image frame based on the regulated waiting time of the ith image frame, the sampling interval of the ith image frame, and the preset waiting delay may include determining whether the regulated waiting time of the ith image frame is longer than the preset waiting delay.

If the regulated waiting time of the ith image frame is longer than the preset waiting delay, a preset adjustment factor for the playing interval may be accessed, and the playing interval of the ith image frame calculated based on the adjustment factor for the playing interval and the sampling interval of the ith image frame.

Alternatively, if the regulated waiting time of the ith image frame is shorter than or equal to the preset waiting delay, the sampling interval of the ith image frame may be assigned as the playing interval of the ith image frame.

Calculating the playing interval of the ith image frame based on the adjustment factor for the playing interval and the sampling interval of the ith image frame may include calculating the playing interval of the ith image frame with the following formula:

$$PlayInterval_i = SampleInterval_i \times \beta;$$

where the $PlayInterval_i$ represents the playing interval of the ith image frame, the $SampleInterval_i$ represents the sampling interval of the ith image frame, represents the adjustment factor for the playing interval, and $\beta$ satisfies $0<\beta<1$.

Furthermore, the one or more programs, executed by the processor 27, may include computer executable instructions to determine a time point for playback of the ith image frame.

For example, in case the time elapsed since the start of playback of the (i−1)th image frame is shorter than the playing interval assigned to the ith image frame, the ith image frame of the video may be played at a time point when a duration equal to the playing interval of the ith image frame is elapsed since the start of playback of the (i−1)th image frame of the video.

The computer executable instructions for calculating the sampling interval of the ith image frame may include extracting a time stamp from attribute information of the ith image frame of the video. The time stamp may mark a time point at which the ith image frame of the video was sampled by a sender device. The instructions may further include calculating the sampling interval of the ith image frame based on the time stamp of the ith image frame and a time stamp of the (i−1)th image frame of the video. The sampling interval may be calculated as a difference between the time stamps of the ith and the (i−1)th image frames.

Furthermore, the one or more programs may further include instructions for receiving the image frames of the video sent by the sender device through a communication network. Further, each image frame received may be added into the buffer queue.

The computer executable instructions for fetching the ith image frame of the video from the buffer queue may include instructions to select the earliest image frame that was added in the buffer queue, in case the buffer queue contains more than one image frame. Further, the instructions may include fetching, from the buffer queue, the earliest image frame as the ith image frame.

It should be understood by those skilled in the art that, part or all of the steps in the methods according to the embodiments of the disclosure may be performed through a corresponding hardware instructed with a program. The program may be stored in a computer readable storage medium, and the computer readable storage medium may include: Read Only Memory (ROM), magnetic disk, Compact Disk, or any other computer readable storage device.

Exemplary method and device for processing a video are described. Specific examples are used herein to set forth the innovative technical solutions provided to solve the technical problems described throughout the present disclosure. The implementation and the application scope of the examples disclosed may vary within the spirit of the disclosure and the examples are not intended to limit the scope of the technical solutions described by the present document. Furthermore, those skilled in the art may modify the specific examples and the application thereof based on the description in the present application. In summary, the specification should not be understood as a limitation of the technical solutions. Any modification or equivalent replacement made by those skilled in the art within the technical scope disclosed in the examples of the disclosure should fall within the scope of protection of the disclosure. Therefore, the scope of protection of the disclosure should be based on the scope of protection of claims.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. A method for processing a video in a network device that comprises a processor, the method comprising:
fetching, by the processor, from a buffer queue, a current image frame of the video;
calculating, by the processor, a sampling interval of the current image frame, wherein the sampling interval is a temporal difference between a first time point at which the current image frame is sampled and a second time point at which a previous image frame of the video is sampled, wherein the previous image frame is an image frame of the video that was fetched from the buffer queue immediately before the current image frame;
calculating, by the processor, a waiting time of the current image frame, wherein the waiting time is a time period between the current image frame being added into the buffer queue and the current image frame being fetched from the buffer queue;
calculating, by the processor, a regulated waiting time of the current image frame based on the waiting time of the current image frame and a previous regulated waiting time, the previous regulated waiting time equal to the regulated waiting time of the previous image frame, wherein the previous regulated waiting time for a first image frame that is fetched from the buffer queue earliest is an assigned value and the regulated waiting time of the first frame is calculated based on the assigned regulated waiting time and the waiting time of the first image frame;
determining, by the processor, a playing interval of the current image frame based on the regulated waiting time of the current image frame, the sampling interval of the current image frame, and a preset waiting delay;
determining, by the processor, whether time elapsed since start of playback of the previous image frame is shorter than the playing interval of the current image frame; and
playing, by the processor, the current image frame at a current time point if the time elapsed since the start of playback of the previous image frame is not shorter than the playing interval of the current image frame.

2. The method according to claim 1, wherein calculating the regulated waiting time of the current image frame comprises:
obtaining a preset adjustment factor $\alpha$ for the waiting time; and
calculating the regulated waiting time of the current image frame with the following formula:

$$AVR\_W_i = \alpha \times AVR\_W_{i-1} + (1-\alpha) \times W_i$$

wherein $AVR\_W_i$ represents the regulated waiting time of the current image frame, $AVR\_W_{i-1}$ represents the regulated waiting time of the previous image frame, and the $W_i$ represents the waiting time of the current image frame.

3. The method according to claim 1, wherein obtaining the playing interval of the current image frame comprises:
determining whether the regulated waiting time of the current image frame is longer than the preset waiting delay; and
in response to the regulated waiting time of the current image frame being longer than the preset waiting delay, obtaining a preset adjustment factor for the playing interval, and calculating the playing interval of the current image frame based on the adjustment factor for the playing interval and the sampling interval of the current image frame; or in response to the regulated waiting time of the current image frame being shorter than or equal to the preset waiting delay, assigning the sampling interval of the current image frame as the playing interval of the current image frame.

4. The method according to claim 3, wherein calculating the playing interval of the current image frame based on the adjustment factor for the playing interval and the sampling interval of the current image frame comprises:
calculating the playing interval of the current image frame with the following formula:

$$PlayInterval_i = SampleInterval_i \times \beta$$

wherein the $PlayInterval_i$ represents the playing interval of the current image frame, the $SampleInterval_i$ represents the sampling interval of the current image frame, and $\beta$ represents the adjustment factor for the playing interval.

5. The method according to claim 1, wherein the method further comprises:
in response to the time elapsed since the start of playback of the previous image frame being shorter than the playing interval of the current image frame, playing the current image frame at a time point when a duration equal to the playing interval of the current image frame is elapsed since the start of playback of the previous image frame.

6. The method according to claim 1, wherein calculating the sampling interval of the current image frame comprises:
extracting, from attribute information of the current image frame, a time stamp, wherein the time stamp marks when the current image frame was sampled by a sender device; and
calculating the sampling interval of the current image frame based on the time stamp of the current image frame and a time stamp of the previous image frame of the video.

7. The method according to claim 1, wherein the method further comprises:
receiving, by the processor, through a network, image frames of the video sent by a sender device; and
adding each received image frame of the video into the buffer queue.

8. The method according to claim 1, wherein fetching, from the buffer queue, the current image frame of the video comprises:
selecting, from a plurality of image frames of the video in the buffer queue, an image frame which was added into the buffer queue the earliest; and
fetching, from the buffer queue, the earliest image frame as the current image frame.

9. A device for processing a video comprising:
a storage having programs stored therein; and
a processor, when executing the programs, configured to:
fetch, from a buffer queue, a current image frame of the video, for playback;
calculate a sampling interval of the current image frame, the sampling interval being a duration between a time point at which the current image frame was sampled and another time point at which a previous image frame was sampled, wherein the previous image frame is an image frame fetched from the buffer queue immediately before the current image frame;
calculate a waiting time of the current image frame, the waiting time being a time period between the current image frame being added into the buffer queue and the current image frame being fetched from the buffer queue;
calculate a regulated waiting time of the current image frame based on the waiting time of the current image frame and a previous regulated waiting time, the previous regulated waiting time equal to the regulated waiting time of the previous image frame, wherein the previous regulated waiting time for a first image frame that is fetched from the buffer queue earliest is an assigned value and the regulated waiting time of the first frame is calculated based on the assigned regulated waiting time and the waiting time of the first image frame;
obtain a playing interval of the current image frame based on the regulated waiting time of the current image frame, the sampling interval of the current image frame and a preset waiting delay;
determine whether time elapsed since start of playback of the previous frame is shorter than the playing interval of the current image frame; and
play the current image frame at the current time point in response to the time elapsed since the start of playback of the previous image frame being longer than or equal to the playing interval of the current image frame.

10. The device according to claim 9, wherein the processor, when executing the programs to calculate the regulated waiting time of the current image frame, is further configured to:
obtain a preset adjustment factor $\alpha$ for the waiting time; and
calculate the regulated waiting time of the current image frame with the following formula:

$$AVR\_W_i = \alpha \times AVR\_W_{i-1} + (1-\alpha) \times W_i,$$

wherein the $AVR\_W_i$ represents the regulated waiting time of the current image frame, the $AVR\_W_{i-1}$ represents the regulated waiting time of the previous image frame, and the $W_i$ represents the waiting time of the current image frame.

11. The device according to claim 9, wherein the processor, when executing the programs to calculate the play interval, is further configured to:
determine whether the regulated waiting time of the current image frame is longer than the preset waiting delay;
obtain a preset adjustment factor for the playing interval in response to the regulated waiting time of the current image frame being longer than the preset waiting delay;
calculate the playing interval of the current image frame based on the adjustment factor for the playing interval and the sampling interval of the current image frame; and
assign the sampling interval of the current image frame as the playing interval of the current image frame in response to the regulated waiting time of the current image frame being shorter than or equal to the preset waiting delay.

12. The device according to claim 11, wherein the processor, when executing the programs to calculate the play interval of the current image frame based on the adjustment factor for the playing interval and the sampling interval of the current image frame, is further configured to calculate the playing interval of the current image frame with the following formula:

$$PlayInterval_i = SampleInterval_i \times \beta,$$

wherein the $PlayInterval_i$ represents the playing interval of the current image frame, the $SampleInterval_i$ represents the sampling interval of the current image frame, and $\beta$ represents the adjustment factor for the playing interval.

13. The device according to claim 9, wherein the processor, when executing the programs to playback the current frame, is further configured to play the current image frame at a time point when a duration of the playing interval of the current image frame is elapsed since the start of playback of the previous image frame, in response to the time elapsed since the start of the playback of the previous image frame being shorter than the playing interval of the current image frame.

14. The device according to claim 9, wherein the processor, when executing the programs to calculate the sampling interval, is further configured to:
   extract, from attribute information of the current image frame, a time stamp that indicates a time point at which the current image frame was sampled by a sender device; and
   calculate the sampling interval of the current image frame based on the time stamp of the current image frame and a time stamp of the previous image frame.

15. The device according to claim 9, further comprises:
   a receiver configured to receive, through a network, image frames of the video sent by a sender device; and
   a second storage, configured to, add each of the received image frames of the video into the buffer queue.

16. The device according to claim 9, wherein the processor, when executing the programs to fetch the current frame, is further configured to:
   select, from multiple image frames in the buffer queue, the image frame added into the buffer queue the earliest; and
   fetch, from the buffer queue, the selected image frame, as the current image frame.

17. A non-volatile storage medium comprising computer-executable instructions, wherein the executable instructions, when executed by a processor, instruct the processor to perform steps comprising:
   fetching, from a buffer queue, an ith image frame of a video, wherein the variable i is a natural number;
   calculating a sampling interval of the ith image frame, the sampling interval being a duration between a time point at which the ith image frame is sampled and another time point on which an (i−1)th image frame is sampled, wherein the (i−1)th image frame being the image frame fetched from the buffer queue immediately before the ith image frame;
   calculating a waiting time of the ith image frame, the waiting time being a time period starting when the ith image frame is added into the buffer queue and ending when the ith image frame is fetched from the buffer queue;
   calculating a regulated waiting time of the ith image frame based on the waiting time of the ith image frame and a previous regulated waiting time of the ith image frame, the previous regulated waiting time for the ith image frame equal to the regulated waiting time of the (i−1)th image frame, wherein the previous regulated waiting time for a first image frame that is fetched from the buffer queue earliest is an assigned value and the regulated waiting time of the first frame is calculated based on the assigned regulated waiting time and the waiting time of the first image frame;
   determining a playing interval of the ith image frame based on the regulated waiting time of the ith image frame, the sampling interval of the ith image frame, and a preset waiting delay;
   determining whether a previous frame playback duration is shorter than the playing interval of the ith image frame, wherein the previous frame playback duration is the duration between a time point at which playback of the (i−1)th image frame is started and a current time point; and
   playing the ith image frame at the current time point in response to the previous frame playback duration not being shorter than the playing interval of the ith image frame.

* * * * *